No. 744,540. PATENTED NOV. 17, 1903.
J. H. HAMMER.
FLASH LIGHT ATTACHMENT FOR CAMERAS.
APPLICATION FILED MAR. 4, 1903.
NO MODEL. 2 SHEETS—SHEET 1.
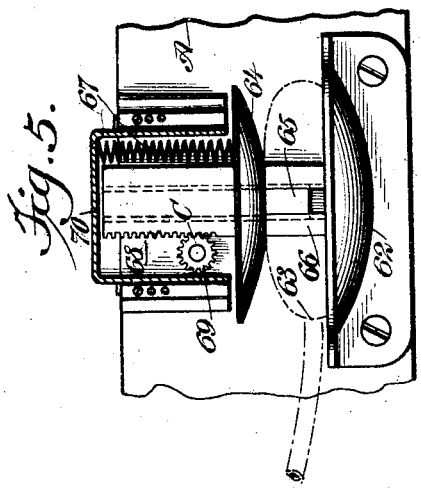
INVENTOR
John H. Hammer
BY
ATTORNEYS.

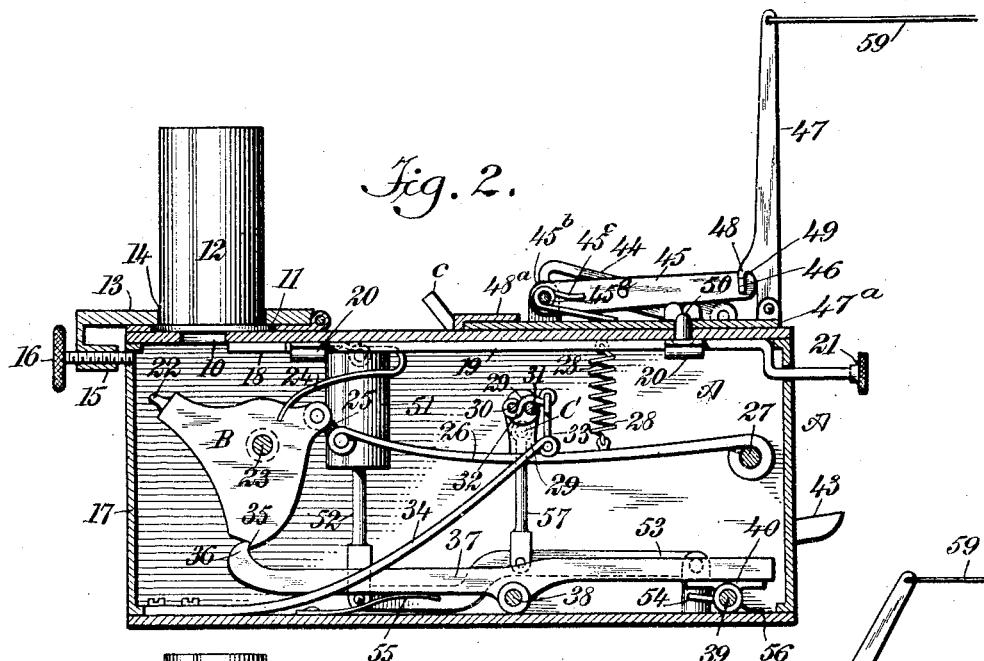
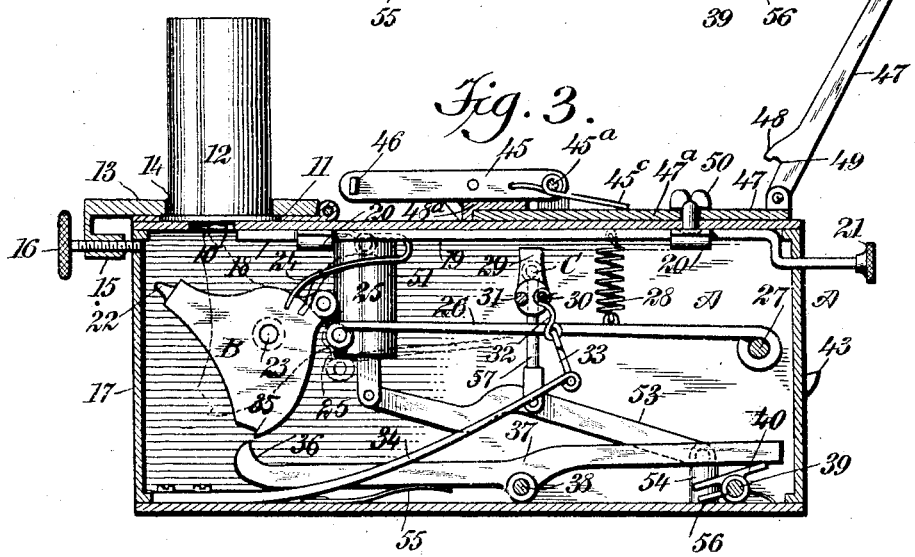
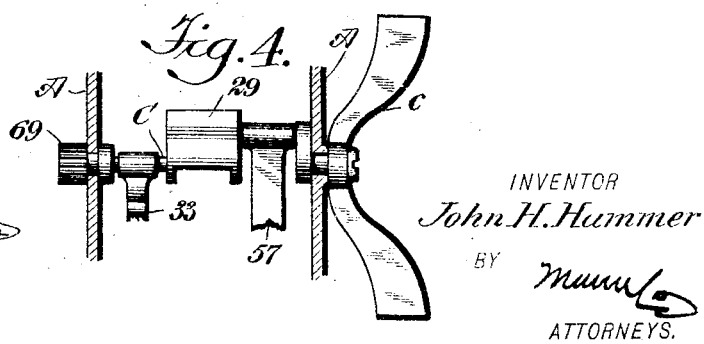

No. 744,540.

Patented November 17, 1903.

UNITED STATES PATENT OFFICE.

JOHN H. HAMMER, OF MARQUETTE, MICHIGAN.

FLASH-LIGHT ATTACHMENT FOR CAMERAS.

SPECIFICATION forming part of Letters Patent No. 744,540, dated November 17, 1903.

Application filed March 4, 1903. Serial No. 146,071. (No model.)

*To all whom it may concern:*

Be it known that I, JOHN H. HAMMER, a citizen of the United States, and a resident of Marquette, in the county of Marquette and State of Michigan, have invented a new and Improved Flash-Light Attachment for Cameras, of which the following is a full, clear, and exact description.

My invention relates to flash-light attachments for cameras; and the purpose of the invention is to provide a construction of a device adapted for direct connection with the shutter of a camera having means for supporting and exploding a flash-light charge and automatically and simultaneously operating the shutter of the camera, which operation of the shutter may be brought about by direct connection with a cylinder operated at the time of explosion of the flash-light material and connected by a tube with the shutter or by the automatic compression of a bulb in tube connection with the shutter.

A further purpose of the invention is to so construct the flash-light attachment for cameras that it will not only be connected with the shutter of a camera, but also with an alarm device of a clock, the latter attachment being so made that at a predetermined time an exposure will be automatically made.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of a camera and a side elevation of the flash-light device, showing the connection between the flash-light device and the camera-shutter. Fig. 2 is an enlarged vertical section through the flash-light device set for operation. Fig. 3 is a view similar to that shown in Fig. 2, the parts appearing in their normal position or the position they occupy just after a cartridge is exploded, showing also in dotted lines the trigger-block in the position it occupies when it acts upon the cap of the cartridge to explode the same. Fig. 4 is a transverse section through the flash-light device, illustrating particularly the setting-shaft and its connections. Fig. 5 is a partial side elevation of the flash-light device and a sectional front elevation of the means carried thereby for compressing a bulb, and Fig. 6 is a front elevation of a camera and clock and a side elevation of the flash-light device and connection between the shutter of the camera and the clock.

A represents a box-receptacle, which may be of any suitable form and may be of any desired material, and usually this box-receptacle is rectangular in general formation. Near one end of the said box-receptacle A, at the top, an opening 10 is made, (shown particularly in Figs. 2 and 3,) and around this opening a depression 11 is formed, in which is fitted the rim of a cartridge 12, adapted to contain a flash-light compound, the primer of which cartridge is over the opening 10. The cartridge is held in place by a clamping-plate 13, pivotally attached to the upper portion of the box-receptacle A, having a suitable opening 14 therein, through which the barrel of the cartridge 12 may upwardly extend. This clamping-plate 13 is adapted to lie close upon the upper surface of the box-receptacle A and has an angular arm 15, which extends beyond the end of the box-receptacle A adjacent to which the cartridge 12 is located. In this arm 15 a thumb-screw 16 is mounted to turn, adapted to enter the end wall 17 of the said box-receptacle A for the purpose of holding the locking-plate 13 in position to clamp the flash-light cartridge 12 upon the upper surface of the said box-receptacle.

When it is desired to prevent the accidental explosion of the material in the cartridge 12, a slide 18 is carried over the opening 10 in the box-receptacle A beneath the cap or primer of the cartridge, and this slide is connected with a rod 19, mounted in bearings 20 at the inner upper surface of the box-receptacle A, and the said rod 19 extends out through the end of the box-receptacle A opposite that at which the cartridge-clamping plate 13 is located, terminating in a suitable knob 21, as is shown in Figs. 2 and 3.

A substantially triangular trigger-plate B is eccentrically pivoted on a suitable shaft 23 at a point below the opening 10, exposing the cap in the cartridge 12. This trigger-block B is provided with a hammer projection 22, adapted in the operation of the trigger-block to be brought in forcible engagement with the cap or primer on the cartridge 12 and explode the same, and thereby ignite the flash-light powder in the barrel of the cartridge 12. This trigger-block B is normally held in the position shown in Figs. 2 and 3—namely, with the hammer projection 22 at a point below the opening 10 beneath the cartridge 12—by means of a spring 24, secured at one end to the under face of the top portion of the receptacle A and to the upper edge of the trigger-block B at a point between its inner upper end and its pivot 23. The inner upper end of the trigger-block B is pivotally attached to a link 25, and this link is pivotally connected with a mainspring 26, which in the normal position of the parts of the device, as shown in Fig. 3, extends almost parallel with the upper portion of the said receptacle A and is pivoted at its outer end upon a suitable stud or spindle 27, extending from side to side of the aforesaid box-receptacle.

A controlling-spring 28 is attached to the mainspring 26 between its ends, and the said controlling-spring 28 is likewise attached to the upper portion of the casing or box-receptacle A, as is shown in Figs. 2 and 3. A crank-shaft C is mounted to turn in the box-casing A, about midway between its ends, and on said crank-shaft a locking-head 29 is secured, which when the said crank-shaft is turned in one direction will engage with the mainspring 26 and press the said spring downward, as is shown in Fig. 2, bringing the said spring in such position as to permit the parts of the device to be brought in the said position. Normally, however, the said part 29 extends upward from the mainspring 26, as is shown in Fig. 3. This part 29, which is for locking engagement with the mainspring 26, is provided with two pins 30 and 31, (shown in Figs. 2 and 3,) and on one pin—the pin 30, for example—an S-link 32 is pivoted, which link in action is adapted to engage with the other pin 31, as is shown in Fig. 2. The said S-link at its outer end is connected with a plain link 33, and this link 33 is pivotally connected with the upper end of a spring 34, which spring at its lower end is securely fastened to the bottom portion of the casing A below the block B, as is shown in Figs. 2 and 3.

The trigger-block B is provided with a notch 35 at its lower inner portion, to be engaged when the block is set by a nose 36, which is formed upon an end of a lever 37, which lever is pivoted upon a suitable shaft or spindle 38, extending from side to side of the aforesaid casing or receptacle A.

Just below the end of the lever 37 opposite that at which the nose 36 is located for locking engagement with the trigger-block B a pallet 40 is mounted upon a suitable shaft 39. As is shown in Fig. 6, this shaft 39 extends beyond one side of the casing or receptacle A. When the parts are set for action, the pallet 40 occupies a horizontal position, (shown in Fig. 2;) but when the parts are to be tripped, so as to produce an action of the trigger on the block B on the cap of the cartridge 12, the said pallet is given an upward position at one end, (shown in Fig. 3,) and in such position of the pallet the nose 36 of the lever 37 is disengaged from the notch 35 of the block B, and the said block is then free to fly upward to engage with the cap or the cartridge 12 and explode the said cap, and thereby ignite the powder which may be contained in the cartridge. Just after such an action, however, the spring 24 asserts itself and restores the block B to its normal position. (Shown also in Figs. 2 and 3.) The spring 34, above described, is of less strength than the mainspring 26, but has more direct action, and the spring 28 adds to the strength of the mainspring, tending to draw it upward when the charge is to be fired, thus accelerating the movement of the block B to promote the ignition of the powder in the cartridge.

The action of the pallet 40 is brought about in the following manner: At one end of the shaft 39 an angle-lever 41 is secured, and this angle-lever is provided with a thumb-piece 43, extending at right angles therefrom. At the upper end of the lever 41 a link 44 is pivotally and adjustably attached, and this link 44 is provided with a longitudinal slot 44$^a$, through which slot a pin 44$^b$ is passed, and the said pin 44$^b$ is attached to a trip-arm 45, which trip-arm 45 is provided with a projection 46, extending inwardly therefrom. This projection or lug 46 is adapted to engage with a trigger-arm 47, which trigger-arm is pivoted at one end of the casing or receptacle A. This trigger-arm 47 is provided with a nose 48, and when the trigger-arm is in the vertical position (shown in Fig. 2) and the trip-arm 45 is in the horizontal position (shown in the same figure) the nose 48 of the trigger-arm engages with and bears down upon the projection 46 from the trip-arm 45, and at the rear of the nose 48 a recess 49 is produced in order that the trip-arm may be effectually locked when its projection 46 is brought into the recess 49. Under this arrangement of parts they are held from operation until the lug or projection 46 from the trip-arm is released from the recess 49 in the trip-arm. Preferably the trip-arm 47 is mounted upon a plate 47$^a$, which is removably mounted on the upper face of the receptacle or casing A, the said plate at one end being made to enter beneath a bracket 48$^a$, attached to the upper portion of the receptacle or casing A. The plate 47$^a$ is locked in position through the medium of a thumb-nut 50, passing through a suitable slot in the plate and into the upper portion of the casing A, as is also shown in Figs. 2 and 3. The trip-arm 45 is secured upon a spindle 45$^a$, which is mounted in suitable bearings 45$^b$, located on the said removable plate 47$^a$, and a spring 45$^c$ is coiled around the spindle 45$^a$, which spring has bearing at one end against the trip-arm 45 and at its opposite end against the said plate 47ª, so that when the trip-arm is carried downward and in direction of an end of the casing A to an engagement with the trigger-arm 47, the said spring 45ᶜ is placed under tension.

A cylinder 51 is located in the casing or receptacle A, the said cylinder being provided with a head having attached thereto a piston-rod 52, as is shown in Fig. 2, and this piston-rod 52 is pivotally attached to an end of a lever 53, which at its opposite end is secured to an upright 54, which is attached permanently to the bottom portion of the receptacle A. A spring 55 is secured to the bottom portion of the said receptacle A, having an upward bearing against the locking-bar 37, which is adapted for engagement with the trigger-block B, as is also shown in Figs. 2 and 3. At this time it may be remarked that a spring 56 is coiled around the shaft or spindle 39, adapted to normally hold the pallet 40 in the inclined position shown in Fig. 3. A bar 57 (see Fig. 4) is connected with the crank-arm of the crank-shaft C near one end of the locking-head 29, and this bar 57 is pivotally connected with the lever 53, as is shown in Figs. 2 and 3. In the operation of this portion of the device when the handle c, attached to the crank-arm C, is turned in one direction the locking-head 29 is forced down upon the mainspring 26, compressing the said spring, as is shown in Fig. 2, and at such time the S-shaped link 32 will be carried over the pin 31 on the said head 29 opposite the pin 30, on which the link is pivoted, thereby placing the spring 34 under more or less tension, and this spring 34 is of less strength than the mainspring 26. At the same time the connecting-bar 57 will be forced downward, thus drawing the piston-rod 52 from the cylinder 51. The trip-arm 45 is then drawn downward, as shown in Fig. 2, and is made to engage with the trigger-arm 47 in the manner shown in the same view. When these parts are thus positioned, the pallet 40 will be brought to the horizontal position (shown in Fig. 2) and will cause the nose 36 of the locking-lever 37 to enter the notch 35 of the trigger-block B and hold the said trigger-block from possible engagement with the cap of the cartridge 12, as is also shown in Fig. 2.

When the material in the cartridge 12 is to be ignited, the trigger-arm 47 is carried outward or in direction of the end of the receptacle or casing A upon which it is mounted, thus releasing the trip-arm 45, which in flying upward will cause the pallet 40 to assume the inclined position shown in Fig. 3, thereby tilting up the heel portion of the lock-lever 37 and throwing down the nose-section 36 of the said lever, carrying the latter part out of engagement with the trigger-block B, and at the same time the link connection 25 between the said trigger-block and the mainspring 26 will tend to restore the spring 26 to its normal position, (shown in Fig. 3,) assisted by the coiled spring 28; but the action of the mainspring 26 will carry the trigger-block upward, so that its hammer projection 22 will engage with the cap of the cartridge 12 and cause an ignition of the flash-light powder in the said cartridge, as is shown in dotted lines in Fig. 3, and as soon as the mainspring 26 fully assumes its normal position the spring 24, connected directly with the trigger-block, will cause the latter to automatically resume its normal position. (Shown in positive lines, Figs. 2 and 3.) As the mainspring 26 acts to assume its normal position, assisted by the coiled spring 28, the spring 34, connected with the locking-head 29, tends to carry the said head from engagement with the mainspring, thus turning the crank-shaft C and bringing the parts to the position shown in Fig. 3.

A tube 57ª is connected with the cylinder 51, and this tube is likewise connected with an actuating-cylinder 58 of any approved construction, forming a portion of a photographic shutter D.

It will be observed from the foregoing description that when the locking-head 29 is released from engagement with the mainspring 26 through the concerted action of the springs 28 and 34 the lever 53 is carried upward at its free end, thus forcing the piston-head on the rod 52 upward in the cylinder 51, causing a pressure of air to occur in the tube 57ª, and thus operate the shutter D.

In Fig. 6 I have illustrated the flash-light mechanism not only as connected with a camera, but likewise connected with an alarm-clock 61. Such connection is made through the medium of a cord or link 59, connected with the trigger-arm 47 at its upper end and with the hammer 60 of the alarm device, so that when the clock is set to a certain period of time and such time arrives and the alarm mechanism is set in motion the first outward movement of the hammer 60 of the alarm mechanism will serve to carry the trigger-arm 47 out of locking engagement with the trip-arm 45, thus permitting the mechanism of the flash-light device to operate and produce a flash in the manner which has been described.

It is not always necessary, although sometimes desirable, to have a time mechanism used in connection with the flash-light device. Therefore an attachment is made to the flash-light apparatus, as is particularly shown in Fig. 5, which will act automatically when the charge is ignited to press the bulb, and so produce an exposure of the plate. This auxiliary device for compressing the bulb 63, and which is shown particularly in Fig. 5, consists of a lower dish member 62, which is permanently attached to the outer side of the casing or receptacle A, and above this lower dish member 62 guides 66 are secured to the said flash-light device. Between these guides a vertical tongue 65 is mounted to slide, which tongue carries an upper member 64, convexed at its lower face and adapted to enter the dished permanent member 62 at its extreme downward movement and to compress the bulb 63, connected with the shutter of the camera, when said bulb is placed between the two members 62 and 64. The upper compressing member 64 is normally directed to the fixed lower member 62 by a spring 67, having bearing against the upper surface of the upper member 64 and against the upper portion of a hood 70, which is attached to the receptacle A and extends downward a predetermined distance over the slide 65 and above the upper member 64. The said slide 65 is provided at one edge with rack-teeth 68, and these rack-teeth are adapted to engage with a pinion 69, which is upon the outer end of the crank-shaft C. Therefore under this arrangement when the mainspring 26 assumes its normal or straight position, (shown in Fig. 3,) due to releasing the trigger-arm 47 from the trip-arm 45, the crank-shaft C is revolved at the time that the locking-head 29 is carried away from the mainspring 26, and at such time the member 64, attached to the slide 65, will be brought in direction of the lower or dished member 62, and the bulb 63 between these two members will be compressed and the shutter of the camera will be opened at the same time that the flash is produced.

Having thus described my invention, I claim as new and desire to secure by Letters Patent—

1. In a flash-light attachment for cameras, a holder for the flash-light cartridge, a device for igniting the contents of the cartridge, an operating mechanism for the ignition device, and an air-compressing cylinder also operated simultaneously with the ignition device and through the same means, which cylinder is adapted for connection with a shutter, as described.

2. In a flash-light attachment for cameras, a receptacle, a cartridge-holding clamp carried thereby, a striking device for the cartridge, an air-compressing cylinder, a trigger-arm, a trip-arm adapted for control by the trigger-arm, and actuating connections between the trip-arm and the cylinder and between the striking device and trip-arm, as set forth.

3. In a flash-light attachment for cameras, a receptacle, a cartridge-holding clamp exteriorly mounted upon the receptacle, a striking device for the cartridge, mounted to rock in the receptacle, an air-compressing device mounted in the receptacle and having an extension beyond the outer wall of the said receptacle, adapted for connection with a shutter, a trip-arm, means whereby the trip-arm in one position holds the striking device in striking position, and devices for temporarily holding the piston of the air-compressing device in its upper position, and a trigger arranged for locking engagement with the trip-arm, as described.

4. In a flash-light attachment for cameras, a receptacle, a cartridge-holding clamp exteriorly mounted upon the receptacle, a spring controlled striking device for the cartridge, mounted for oscillation in the receptacle, an air-compressing cylinder in the receptacle, having an outlet adapted to receive a tube, a lock-lever for the striking device, an actuating-lever for the air-compressing cylinder, a controlling-spring for the striking device, and a controlling mechanism for the said controlling-spring and the cylinder, whereby said parts are simultaneously operated in the manner described.

5. In a flash-light attachment for cameras, a receptacle, a cartridge-holding clamp for the receptacle, a striking device mounted to rock in the receptacle, and an air-compressing cylinder also within the receptacle, a lock-lever for the striking device, a lever for operating the piston-rod of the cylinder, a depressing mechanism for the said mainspring and piston-rod of the cylinder, means for releasing the depressing mechanism, and a trigger arranged to lock the trip device in position to hold the striking device temporarily against movement, as specified.

In testimony whereof I have signed my name to this specification in the presence of two subscribing witnesses.

JOHN H. HAMMER.

Witnesses:
ANTHON O. KRUGER,
MARTIN C. JOHNSON.